United States Patent [19]
Acda

[11] 3,853,450
[45] Dec. 10, 1974

[54] DEVICE FOR SHAPING A BELL END TO A TUBE

[75] Inventor: Petrus Marinus Acda, Enkhuizen, Netherlands

[73] Assignee: Polra-Nederland N.V., Enkhuizen, Netherlands

[22] Filed: Dec. 21, 1970

[21] Appl. No.: 100,296

[30] Foreign Application Priority Data
Dec. 24, 1969  Netherlands .................. 6919424

[52] U.S. Cl. .................. 425/393, 425/457, 425/460
[51] Int. Cl. .......................................... B29c 17/02
[58] Field of Search .......... 425/392, 393, 398, 457, 425/460, DIG. 58; 72/316, 317, 478; 264/314; 18/19 TE

[56] References Cited
UNITED STATES PATENTS
3,377,659  4/1968  Hucks .............................. 425/457
3,248,756  5/1966  Mills et al. ....................... 425/392

Primary Examiner—Robert L. Spicer, Jr.
Attorney, Agent, or Firm—Albert C. Nolte, Jr.; Edward B. Hunter; C. Bruce Hamburg

[57] ABSTRACT

A device for shaping a bell end on a thermoplastic tube includes a mandrel having a central portion and a shaping ring slidable on the central portion, the ring having a hardness greater than that of the thermoplastic material at ambient temperature, but less than that of the thermoplastic material at the deforming temperature. The shaping ring may have an end portion to engage a slot in the central portion of the mandrel, or the shaping ring may have dovetail ribs engaging the central portion. The mandrel may have an additional slidable portion for holding the other end of the shaping ring.

9 Claims, 7 Drawing Figures

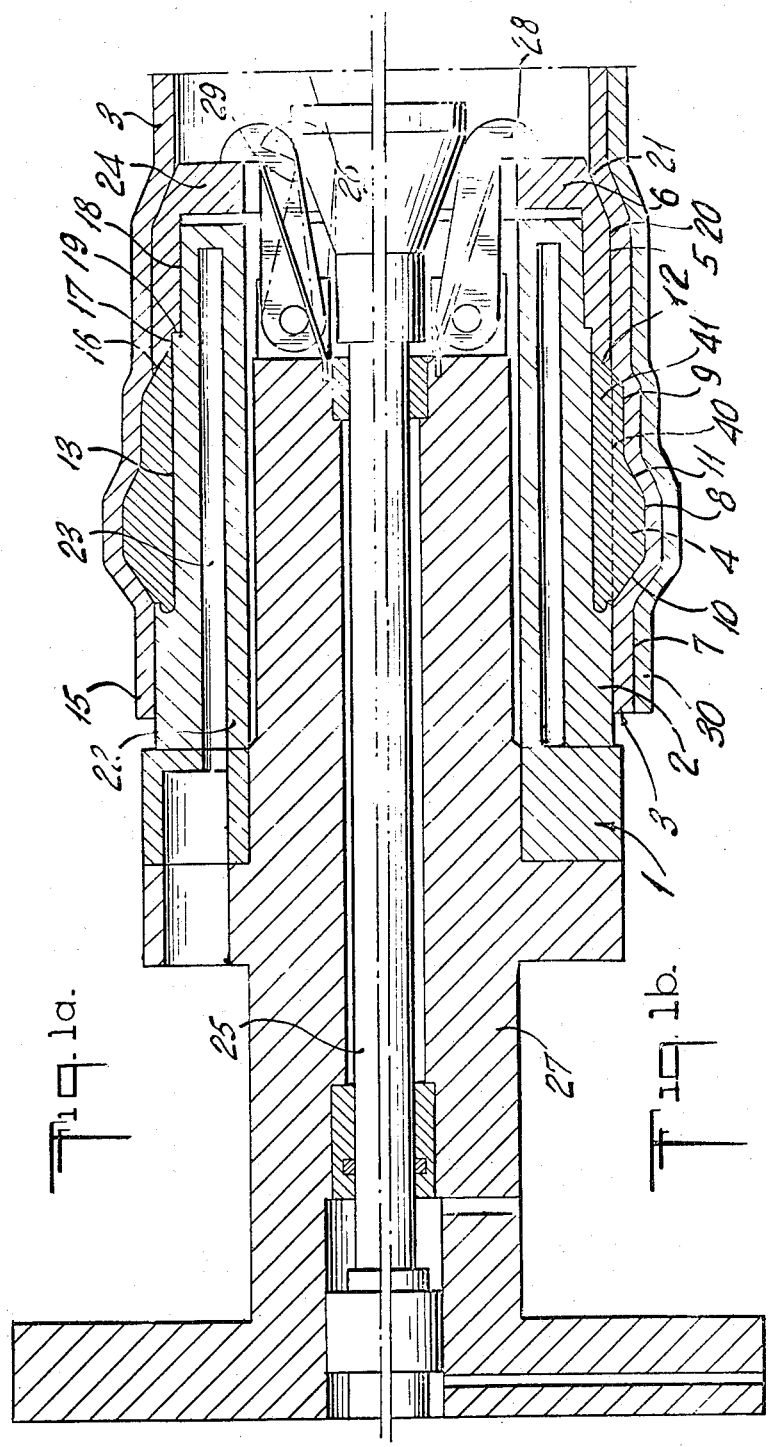

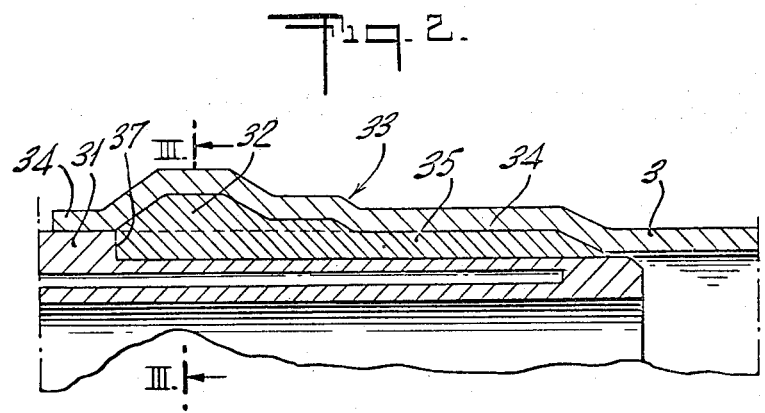
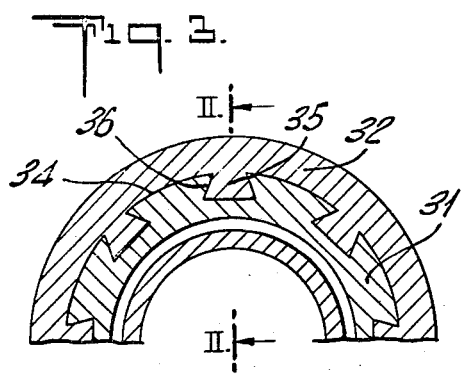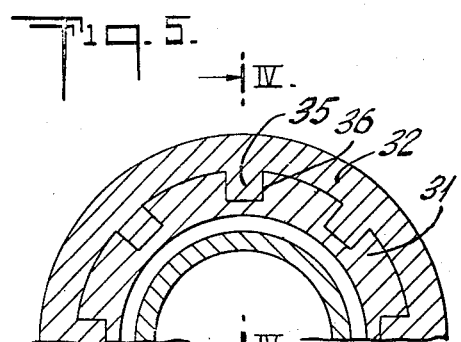
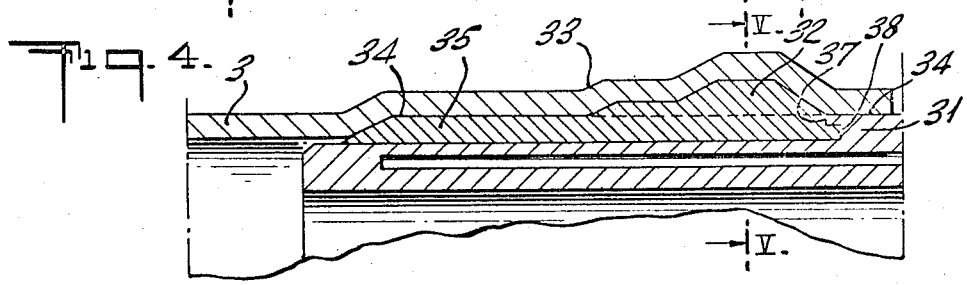
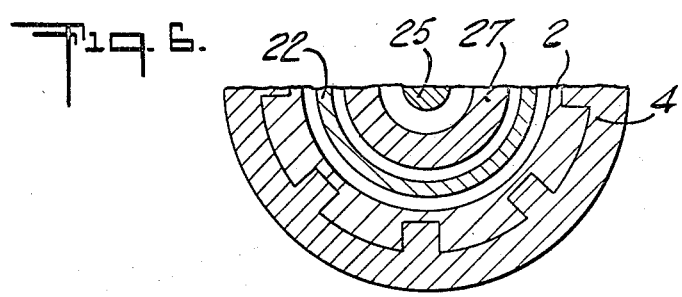

DEVICE FOR SHAPING A BELL END TO A TUBE

The present invention relates to a device for shaping a bell end to a tube of a thermoplastic material, the bell end comprising at least one inner surface (widening) having a larger diameter than that of its opening, the latter extending downward to the outer surface of the tube or of the spigot end to be introduced, said device being provided with a cylindrical mandrel, having an outer profile being almost like the inner profile of the bell end to be shaped, said mandrel having from its insert or front end an outer surface with stepwise varying diameter, the transition between adjacent mandrel-surfaces of different outer diameter gradually merging under an angle less than 45° with respect to the axis, the front end of said mandrel having an edge portion inclining forwardly and downwardly, the smallest inner diameter of which being smaller than the inner diameter of the tube.

With such a device applied to manufacture a bell end to a tube, according to Dutch Pat. No. 121,936 in the name of applicants, after expanding during heating of the tube end for shaping same with two widened portions, a sealing ring of rubber or similar material having an axially extended lip portion, inclining downwardly and inwardly, being mounted on a clamping ring of preferably the same material as that of the tube and with its lip directing forwardly, is positioned in the largest of both widenings of the bell end.

Thereafter, the end edge-portion of the coupling member joining the above mentioned largest widened portion is shaped on applying heat and compression of the sealing ring, which can be done in a known way be means of either a mechanical tool, or a compression medium engaging the outer surface of the sleeve.

Although with this final shaping of the bell end of the tube, on using the clamping ring with the resilient sealing ring enveloping same as 'shaping-mandrel,' a circumferentially uniform flat surface is obtained of said portion of the inner surface of the bell end, which surface in the nature of things is inexact in measure.

The present invention aims at providing a device as described in the preamble, by means of which the bell end cannot only be given a circumferentially uniform flat inner surface, but moreover the inner surface along the entire axial dimension of the bell end can accurately be calibrated.

To that end in an embodiment according to the present invention the mandrel comprises a portion of a hard material, the rear end of said portion having an outer surface with a largest diameter which is at least almost like the diameter of the outer surface of the tube portion joining the bell end to be shaped and an annular portion or 'shaping-ring,' which is slidable on the first mentioned portion of the mandrel, said shaping-ring having locally at least one outer surface with a diameter being larger than the largest diameter of the outer surface of the first mentioned mandrel-portion, said shaping-ring being made of material having a hardness between that of the thermoplastic material of the bell end to be shaped at the ambient temperature and that at the deforming temperature thereof and which shaping-ring has at least locally a surface with an inner diameter which is less than the largest diameter of the outer surface of the first mentioned mandrel-portion, said shaping-ring joining the said edge portion.

Herewith on mutual axial movement of the bell end and the device according to the invention the surface of the shaping ring having locally a larger outer diameter than the largest diameter of the outer surface of the first mandrel portion has been intended for calibratedly shaping the widened portion(s) which has(have) a larger inner diameter than the largest diameter of the outer surface of the first mandrel-portion, whereas the portion of the shaping ring having at least locally a surface with inner diameter less than the largest diameter of the outer surface of the first mandrel portion has been intended for abutment, to prevent boackward sliding movement of the shaping ring past a predetermined location at the first mandrel portion under influence of the frictional forces arising during mutual axial movement of the tube and the device.

Although with regard to the substantially radial forces required for expanding the tube, the material of the shaping-ring should have a special shape and degree of hardness, it is desired with a view to the simultaneously arising frictional forces to take care that during the mutual axial movement of the tube and the device according to the invention, the radial dimension of the shaping ring which is slidable along the first mandrel portion, remains fixed on said predetermined location.

For that purpose in a further embodiment of the device according to the present invention the shaping ring has been provided with means for preventing deformation of the shaping ring radial outwardly.

In a simple embodiment of the device according to the invention the inner surface of the shaping ring has been provided with longitudinal ribs engaging longitudinal grooves in the outer surface of the firmst mentioned mandrel portion.

Such an embodiment of the device according to the invention provides in a simple way the abutment, which prevents further backwards sliding movement of the shaping ring, and provides the means to prevent radial deformation of the shaping ring.

The cross-section of grooves as well as ribs may then advantageously be dovetail-shaped.

In order to obtain a further security against radial sliding movement or deformation of the shaping ring, the rear end of the shaping ring according to another embodiment of the device according to the present invention has an edge portion extending in axial direction to below the contiguous outer surface of the first mentioned mandrel portion.

The present invention still comprises another embodiment which is characterized in that a portion at the front-end of the mandrel with its edge portion, is constituted by a separate sleeve-like portion of a similar hard material as the first mentioned mandrel-portion, said sleeve-like portion having an outer-surface the largest diameter of which is at least almost like that of the outer surface of the tube portion joining the bell end to be shaped, said sleeve-like portion being slidable upon the first mentioned mandrel-portion, however, in its operative position, has been secured against sliding backward, such that the shaping-ring has then correctly been fixed without deformation.

By means thereof the uniformity of the outer profile along the entire length of the mandrel will be secured.

In the last-mentioned embodiment of the device according to the invention the shaping ring has advantageously an edge portion at its frond end, said edge portion extending in axial direction to below the outer surface of the sleeve-like portion. Thus the security of the shaping ring against each undesired sliding movement or deformation is still further secured.

A preferred embodiment of the device according to the invention is characterized in that the 'sleeve-like' portion in its operative position is adapted to be clamped against the first mentioned mandrel portion, the latter being centrally bored, through which bore a rod is axially slidable, being provided with hooks which are adapted to pivot radial outwardly against spring pressure, said hooks then engaging the sleeve like portion with an axially directed pressure force.

A further advantage of the device according to the present invention is the simplicity of the construction constituting the shaping-surface, said construction either comprising merely a shaping ring which has a limited slidable movement along a first portion, or beside these portions, still comprising a sleeve-portion which has a limited slidable movement along said first mentioned portion.

The present invention will now be elucidated with the aid of several embodiments shown schematically in the accompanying drawing, in which:

FIG. 1a is an axial section of a preferably applied embodiment of the device in which the mandrel comprises a first mandrel portion, along which a shaping ring and a sleeve-like portion are axially slidable, and the tube to be deformed and the mandrel have mutually axially been moved along the correct dimension;

FIG. 1b is a modification of the device of FIG. 1a in which a strengthening sleeve is provided on the tube, FIG. 2 is an axial section of the top of another embodiment of the device in which only the shaping ring being slidable along the first mandrel portion, is present;

FIG. 3 is a cross-section along the line III — III of FIG. 2;

FIG. 4 is an axial section of the upper half of a modification of the device of FIG. 2;

FIG. 5 is a cross-section along the line V-V of FIG. 4; and

FIG. 6 is a cross-section of a modification of the portion of the device of FIG. 1.

The embodiment of the device shown in FIG. 1a has been provided with a cylindrical mandrel, generally indicated by the numeral 1, comprising a portion 2 of a hard material, e.g., metal, the rear end of which having an outer surface with a largest diameter which is at least almost like the diameter of the outer surface of the tube portion 3 joining the bell end to be shaped, an annular portion or shaping ring 4 slidable along the said portion 2 and a portion 5 at the ront end of the mandrel, which portion 5 together with an end edge portion 6 of the mandrel constitute a separate sleeve-like portion, also being slidable along the mandrel portion 2 and of which the material, e.g., may be the same as of the first mandrel portion.

The rear end of the mandrel portion 2 has an outer surface 7 with a largest diameter which is at least almost like the diameter of the outer surface of the tube 3 of a thermosplastic material.

The mandrel portion, indicated as shaping ring 4, has at two locations 8,9 an outer surface with a diameter which is larger than he largest diameter of the outer surface 7 of the mandrel portion 2 and has been made of a material having a hardness between that of the thermoplastic material of the bell end to be shaped at the ambient temperature and that at the deforming temperature thereof.

The transitions 10,11,12 between adjacent mandrel-surfaces having varying outer diameters, merge under an angle of maximally 45° with respect to the axis.

In order to render the shaping ring 4 slidable along the mandrel portion 2 and at the same time to secure same against further backward sliding movement in the position shown, the shaping ring has a surface 13 with an inner diameter less than the largest diameter of the outer surface 7 of the mandrel portion 2.

The base portion of the mandrel portion 2 has been extended forwardly with a cylindrical portion having an outer surface 17 of the same diameter as the inner surface 13 of the shaping ring, which portion ends in a cylindrical portion having an outer surface 18 of less diameter. The cylindrical surfaces 17 and 18 are separated by an upright collar 19.

Said sleeve-like portion 5 with an end portion 6 is slidable along the cylindrical surface 17,18 of the mandrel portion 2, the collar 19, in the position shown, preventing further backward sliding movement of the sleeve-like portion.

The outer surface 20 of the portion 5 has a diameter similar to that of the outer surface 7 of the mandrel portion 2, whereas the outer surface 21 of the edge portion 6 decreased gradually tapering to a diameter less than the inner diameter of the tube 3.

In the position of the sleeve-like portion 5 shown in which same abuts the collar 19 of the mandrel portion 2, the shaping ring has been fixed without deformation correctly in the 'chamber' formed between the portions indicated.

The first mandrel portion 2 is in fact comprising a tube piece 22, the wall of which has an annular recess 23 for cooling the tube piece to the right temperature with a cooling medium during the shaping of the ball end of the tube 3.

The edge portion 6 of the sleeve-like portion 5 comprises an edge 24 extending radially as far as the inner surface of the tube piece 22. A rod 25 having a conically widened end portion 26, is axially slidable within the bores of the tube piece 22 and the edge 24. A cylindrical thick walled tube 27, fixedly connected to the tube piece 22 and along the inner surface of which tube the rod 25 is slidably guided, comprises at its front end a number of pivoting hooks 28 which on sliding backward of the rod, are adapted to move radial outwardly against the pressure of lead-springs 29, the ends of said hooks then engaging the edge 24 of the sleeve-like portion to maintain said portion firmly pressed against the collar 19 of the mandrel portion 2.

On mutual axial sliding of the tube 3 and the mandrel 1 to the position with regard to the sleeve-like portion 5 and the mandrel portion 2 shown, the tube end in heated condition-and on cooling of the tube portion 22-is gradually widened in three steps, the front portion of the bell end having reached the end-position shown, being pressed against the outer surface of the mandrel e.g., by means of a tool acting from the outside, so that the bell end of the tube 3 the inner profile of which being almost similar to the outer profile of the mandrel, is shaped.

Owing to the shaping ring maintaining its axial and radial dimensions as a consequence of the cooperation between the undercut 15 and the bevelled edge 16 of the sleeve-like portion 5, the bell end obtains a circumferentially uniform flat surface which moreover, is exactly calibrated.

The bell end having obtained its desired shape, the rod 25 is first moved forward, so that the hooks 28 are released from the sleeve-like portion 5,6 after which the mandrel portion 2 of the tube portion 22 together with the tube 27 are drawn backwards with regard to the tube 3. Thereupon the shaping ring 4, which has then become deformable, can be removed by means of a hooked tool on deformation of the bell end.

Finally the sleeve-like portion 5.6 can be removed from the bell end by means of the tool controlled by the rod 25.

FIG. 1b shows a variation of the embodiment of FIG. 1a, in which a strengthening sleeve 30 is provided over the tube 3. The sleeve 30 is placed over the end of the tube 3 prior to the expansion of the tube 3 on the mandrel, and the sleeve 30 is thereby expanded with the tube 3.

In FIGS. 2 and 3 a very simple embodiment of the device has been shown, in which merely a shaping ring 32 is slidable along a mandrel portion 31 corresponding with the mandrel portion 2 of the tube end 22 of FIG. 1a. The relief of the outer surface of the mandrel is similar to that of the mandrel according to FIG. 1a. In FIG. 2 the bell end 33 shaped on the mandrel has still been shown.

The shaping ring comprises a solid portion extending radial inwardly to the outer surface 34 of the first mandrel portion 31, having a diameter which is at least almost like that of the outer surface of the tube 3 joining the bell end 33 to be shaped and, longitudinal ribs 35, which extend further radial inwardly from said solid portion, said ribs 35 engaging corresponding longitudinal grooves 36 (FIG.3) in the above mentioned outer surface 34.

In FIG. 2 and 3 the cross-section of ribs and grooves has been shown dovetail-like, in which case the abutment 37 of the first mandrel portion limiting backward sliding movement of the shaping ring need not be provided with an undercut.

The arrangement of FIGS. 4 and 5 is identical to that of FIGS. 2 and 3 with the exception that the ribs and grooves are shown having a rectangular cross-section, in which case the abutment for the shaping ring of the first mandrel portion preferably comprises an undercut 38.

In the embodiment of FIGS. 2-5, the first mandrel portion 31 can be drawn from the bell end 33 after the shaping thereof, after which the shaping ring, then having become deformable, can be removed with the hooked tool.

Combinations of embodiments as described above, are possible, e.g., the shaping ring may be provided with longitudinal ribs 41 at the location indicated with a dotted line 40 in FIG. 1a, which longitudinal ribs 41 engage corresponding longitudinal grooves in the first mandrel portion 2. This arrangement is illustrated in FIG. 6.

I claim:

1. In a device for shaping a bell end on a tube of thermoplastic material, wherein the bell end has an inner surface with a larger diameter than its opening so that the inside of the tube tapers radially inwardly from the larger diameter inner surface toward the opening thereof, and wherein the shaping device has a cylindrical mandrel with an outer profile shaped substantially the same as the shape to be formed on the tube, the mandrel having an outer surface that varies in diameter in a stepwise manner from the end thereof to be inserted in the tube, with the transitions between adjacent steps of the mandrel surface gradually merging with angles less than 45° with respect to the axis thereof, and wherein said end of the mandrel is tapered so that the end diameter is less than the inner diameter of the tube; the improvement wherein said mandrel is comprised of a central member of a material that is hard in comparison to said thermoplastic material, said central member having a largest diameter portion spaced from said end and having a diameter that is not substantially less than the outer diameter to be shaped, and an intermediate portion between said end and said largest diameter portion and having a lesser diameter, and a shaping ring slidable on said intermediate portion, said shaping ring having at least one outer surface with a diameter larger than that of said largest diameter portion of said central member, said shaping ring being of a material having a hardness between that of said thermoplastic material at ambient temperature and that of said thermoplastic material at the deforming temperature thereof, said shaping ring further having an inner diameter which is less than the largest diameter of said largest diameter portion, said shaping ring being axially removable without deformation over said end of said central member, whereby said shaping ring is removed from said tube only when the central member is axially displaced from said ring.

2. The device of claim 1 comprising means on said shaping ring for preventing radial outward deformation of said shaping ring.

3. The device of claim 2 wherein the outer surface of said intermediate portion has longitudinally extending grooves, and the inner surface of said shaping ring has longitudinally extending ribs which engage said grooves.

4. The device of claim 2 wherein said means for preventing deformation comprises a projection on the end of said shaping ring away from said end of said mandrel, said projection extending axially to a position below the outer surface of said largest diameter portion of central mandrel portion.

5. The device of claim 1 wherein said mandrel further comprises a separate sleevelike portion of material similar to said central portion, said sleevelike portion being slidably positioned on said end of said central mandrel portion and having an outer diameter not substantially less than that of the outer surface of the portion of the tube adjacent said bell to be shaped, said sleevelike portion being positioned to hold said shaping ring from sliding from said central portion, and means for limiting the movement of said sleevelike portion away from said end of said mandrel.

6. The device of claim 5 wherein said shaping ring has projection means at the end thereof toward said end of said mandrel, said projection means extending axially to a position below the outer surface of said sleevelike portion.

7. The device of claim 6 wherein said projection means is in the form of a bevelled end on said shaping ring, said bevelled end extending radially inwardly toward said end of said central member, and said sleevelike portion has a bevelled end for engaging the bevelled end of said shaping ring.

8. The device of claim 5 wherein said central portion of said mandrel has a central bore, rod means slidably positioned in said bore, hook means pivotally mounted on said mandrel and operatively coupled to said rod said hook means being positioned to releasably clamp said sleevelike portion in a fixed position on said end of said central portion of said mandrel.

9. The device of claim 8 wherein said rod means has a bevelled end tapering radially outwardly toward the end thereof for engaging said hook means, further comprising spring means for biasing said hook means away from said sleevelike portion.

* * * * *

UNITED STATES PATENT OFFICE
CERTIFICATE OF CORRECTION

Patent No. 3,853,450  Dated December 10, 1974

Inventor(s) Petrus Marinus Acda

It is certified that error appears in the above-identified patent and that said Letters Patent are hereby corrected as shown below:

On the Cover Sheet, in item [73] "Polra-Nederland" should read -- Polva-Nederland --.

Signed and sealed this 18th day of March 1975.

(SEAL)
Attest:

RUTH C. MASON
Attesting Officer

C. MARSHALL DANN
Commissioner of Patents
and Trademarks